US010802836B2

(12) United States Patent
Parhar et al.

(10) Patent No.: US 10,802,836 B2
(45) Date of Patent: Oct. 13, 2020

(54) INTELLIGENTLY DETERMINING A VIRTUAL MACHINE CONFIGURATION DURING RUNTIME BASED ON GARBAGE COLLECTION CHARACTERISTICS

(71) Applicant: Oracle International Corporation, Redwood Shores, CA (US)

(72) Inventors: Poonam Parhar, Fremont, CA (US); Charles Joseph Hunt, Libertyville, IL (US)

(73) Assignee: Oracle International Corporation, Redwood Shores, CA (US)

( * ) Notice: Subject to any disclaimer, the term of this patent is extended or adjusted under 35 U.S.C. 154(b) by 76 days.

(21) Appl. No.: 16/268,063

(22) Filed: Feb. 5, 2019

(65) Prior Publication Data

US 2020/0125373 A1 Apr. 23, 2020

Related U.S. Application Data

(60) Provisional application No. 62/747,852, filed on Oct. 19, 2018.

(51) Int. Cl.
| | |
|---|---|
| *G06F 9/445* | (2018.01) |
| *G06F 9/455* | (2018.01) |
| *G06F 9/50* | (2006.01) |
| *G06F 12/02* | (2006.01) |

(52) U.S. Cl.
CPC ........ *G06F 9/44505* (2013.01); *G06F 9/4552* (2013.01); *G06F 9/45533* (2013.01); *G06F 9/5016* (2013.01); *G06F 12/0253* (2013.01); *G06F 2212/1044* (2013.01); *G06F 2212/152* (2013.01)

(58) Field of Classification Search
CPC ....................................................... G06F 9/445
See application file for complete search history.

(56) References Cited

U.S. PATENT DOCUMENTS

| | | | |
|---|---|---|---|
| 7,174,354 B2 | 2/2007 | Andreasson | |
| 8,356,061 B2 | 1/2013 | Vengerov | |
| 9,384,129 B2 | 7/2016 | Basu et al. | |
| 9,507,712 B2 | 11/2016 | Jamison | |

(Continued)

OTHER PUBLICATIONS

Universal Java GC analysis tool—Java Garbage collection log analysis made easy, www.gceasy.io, Jun. 2018, 8 pages.

(Continued)

*Primary Examiner* — Charlie Sun
(74) *Attorney, Agent, or Firm* — Invoke

(57) ABSTRACT

Techniques for determining a virtual machine configuration based on garbage collection characteristics are disclosed. GC characteristics associated with GC cycles executed on a memory allocated for execution of an application are obtained. A relationship between GC variables is determined based on the GC characteristics collected over a time period of interest. A target GC characteristic is input to the GC variable relationship to determine an expected GC characteristic. The target GC characteristic may be, for example, a target cumulative pause time per a time interval. A virtual machine configuration is determined based on the expected GC characteristic. The virtual machine configuration is applied to a virtual machine executing the application.

22 Claims, 13 Drawing Sheets

(56) References Cited

U.S. PATENT DOCUMENTS

| | | | |
|---|---|---|---|
| 9,588,885 B1* | 3/2017 | Ganta | G06F 3/0604 |
| 9,710,379 B2 | 7/2017 | Foley | |
| 2003/0196061 A1 | 10/2003 | Kawahara et al. | |
| 2007/0136402 A1 | 6/2007 | Grose et al. | |
| 2020/0034288 A1* | 1/2020 | Kennke | G06F 12/0269 |

OTHER PUBLICATIONS

Liu et al., Automated JVM Tuning with Bayesian Optimization, Twitter Engineering Advanced Technology Group, JAVAONE 2016, 44 pages.
Janapati, Enabling and Analysing the Garbage Collection log, 2016, Smarttechie.org.
FromDev, Garbage Collection Logs Analysis Using Splunk, Jun. 2018, 4 pages.
Censum—jClarity, Goodbye memory leaks and application pauses, 4 pages, Jun. 2018.
Ansel et al., OpenTuner: An Extensible Framework for Program Autotuning, 13 pages, http://hdl.handle.net/1721.1/81958, Nov. 2013.

* cited by examiner

INTELLIGENTLY DETERMINING A VIRTUAL MACHINE CONFIGURATION DURING RUNTIME BASED ON GARBAGE COLLECTION CHARACTERISTICS

INCORPORATION BY REFERENCE

The following U.S. patent application is hereby incorporated by reference: U.S. Provisional Patent Application No. 62/747,852 filed Oct. 19, 2018.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to virtual machines. In particular, the present disclosure relates to determining a virtual machine configuration based on garbage collection characteristics.

BACKGROUND

A compiler converts source code, which is written according to a specification directed to the convenience of the programmer, to either machine or object code, which is executable directly by the particular machine environment, or an intermediate representation ("virtual machine code/instructions"), such as bytecode, which is executable by a virtual machine that is capable of running on top of a variety of particular machine environments. The virtual machine instructions are executable by the virtual machine in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine resides.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
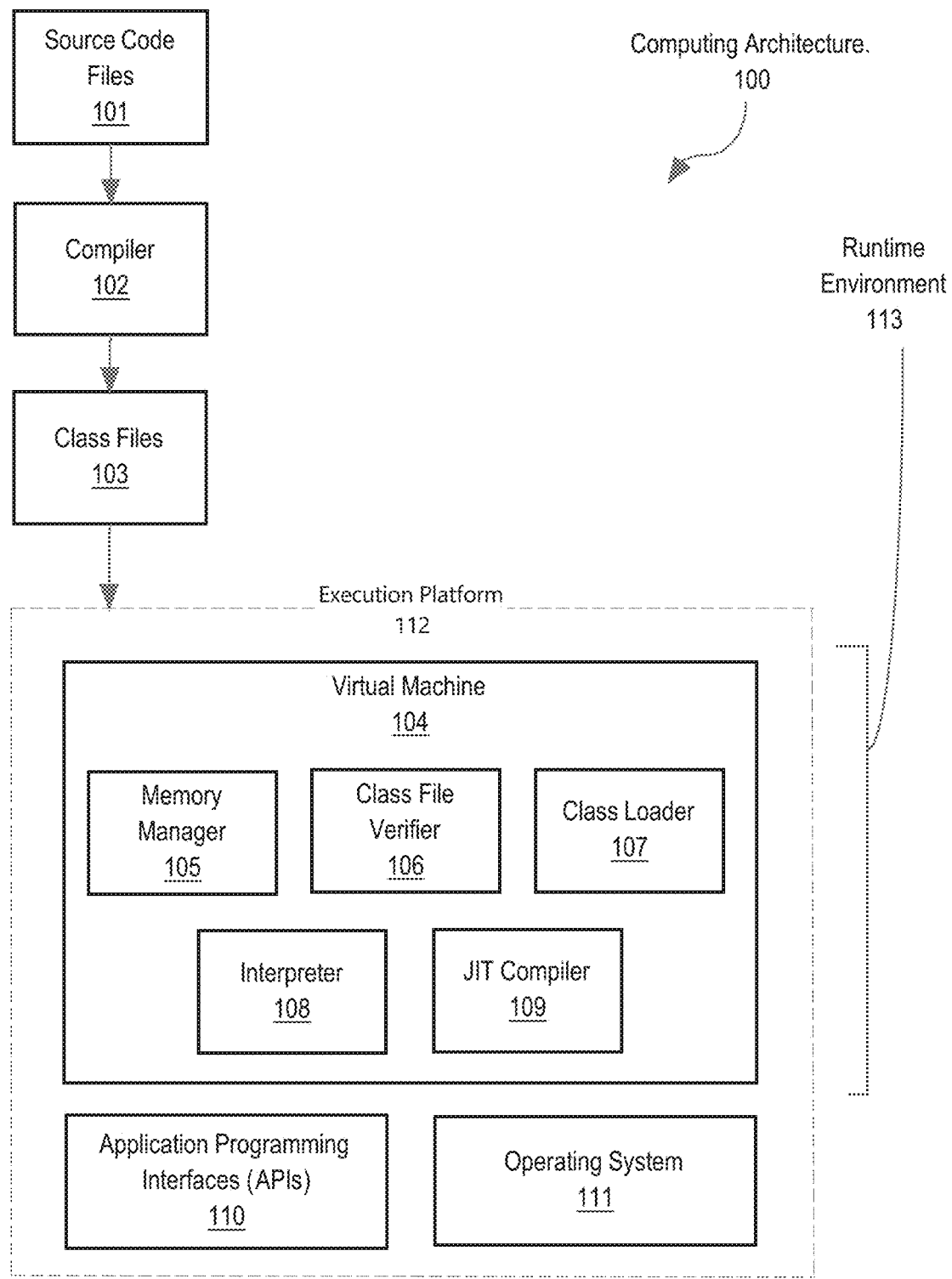
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 EXAMPLE CLASS FILE STRUCTURE
   2.2 EXAMPLE VIRTUAL MACHINE ARCHITECTURE
   2.3 LOADING, LINKING, AND INITIALIZING
3. GARBAGE COLLECTION
4. CONFIGURATION SYSTEM ARCHITECTURE
5. DETERMINING A GC VARIABLE RELATIONSHIP BASED ON GC CHARACTERISTICS
6. DETERMINING A VM CONFIGURATION FOR ACHIEVING A TARGET GC CHARACTERISTIC USING A GC VARIABLE RELATIONSHIP
7. APPLYING A VM CONFIGURATION TO A VM
8. EXAMPLE EMBODIMENT
9. MISCELLANEOUS; EXTENSIONS
10. HARDWARE OVERVIEW

1. General Overview

One or more embodiments include determining a virtual machine (VM) configuration based on garbage collection (GC) characteristics obtained over multiple time intervals. A configuration system obtains GC characteristics associated with GC cycles executed on a memory that is allocated for execution of an application (such as, a heap memory). The configuration system determines a relationship between GC variables based on the GC characteristics collected over a time period of interest. The configuration system applies a target GC characteristic to the GC variable relationship to determine an expected GC characteristic. The target GC characteristic may be, for example, a target cumulative pause time per a time interval. The expected GC characteristic may be, for example, a memory size of a portion of a young generation space, within the memory, that is allocated before a GC cycle. The configuration system determines a VM configuration based on the expected GC characteristic.

Existing methods for determining a VM configuration require multiple executions of an application, each time using a different VM configuration. Existing methods for determining a VM configuration utilize static information, such as the different VM configurations that are set for the VM at the start of executing the application.

A configuration system described herein is an improvement over existing methods. The configuration system utilizes GC characteristics that are not necessarily associated with multiple VM configurations; the GC characteristics may be associated with a single VM configuration. Using the configuration system, there is no need for the inefficient processes of restarting and/or reconfiguring the VM multiple times, as in the existing methods. Moreover, the configuration system utilizes GC characteristics detected during a runtime of an application, such as a memory size of a portion of a heap that is allocated before a GC cycle (also referred to herein as "size of allocated heap before GC cycle"), and/or a memory size of a portion of a heap that is allocated after a GC cycle (also referred to herein as "size of allocated heap after GC cycle"). The configuration system thereby accepts a richer set of input data, as compared with existing methods.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
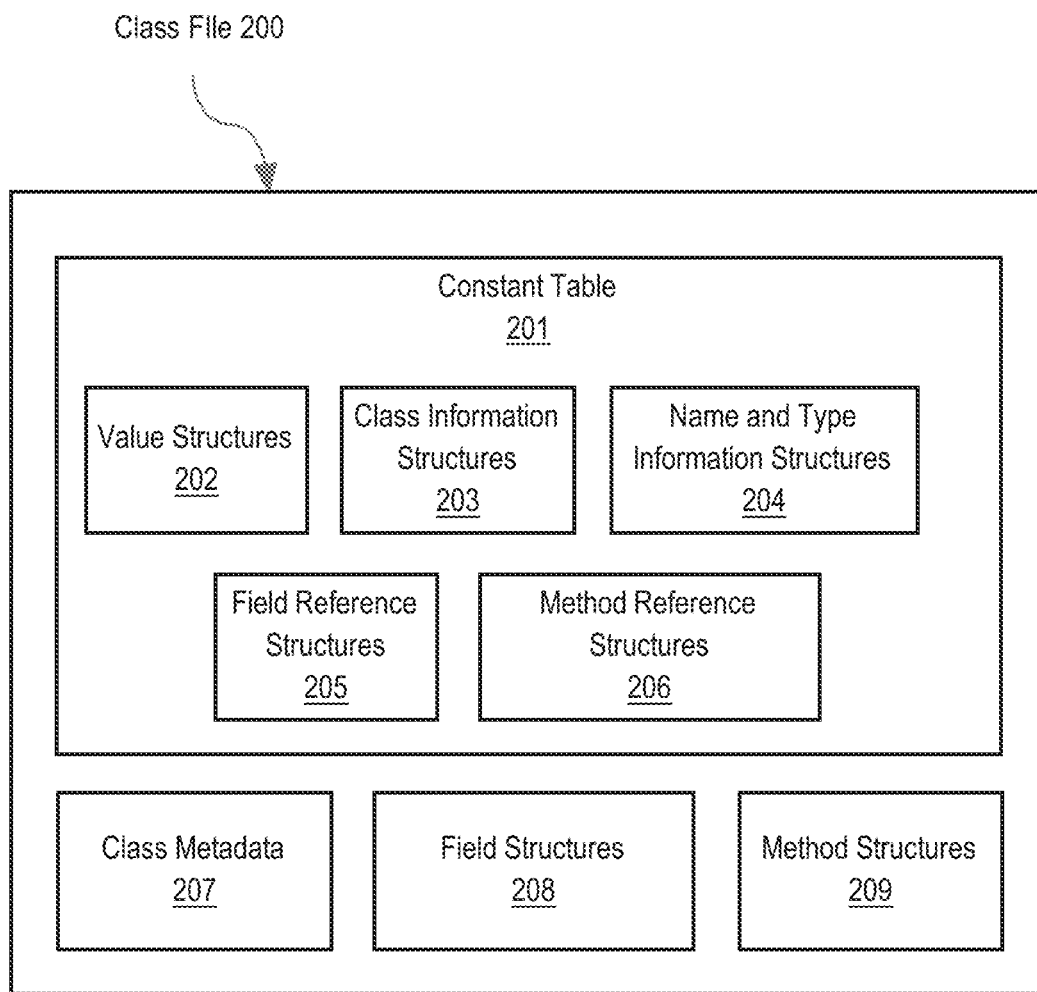
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class structures 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class structures 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment 113 and allocated concrete memory locations.

2.2 Example Virtual Machine Architecture

Figure 3:
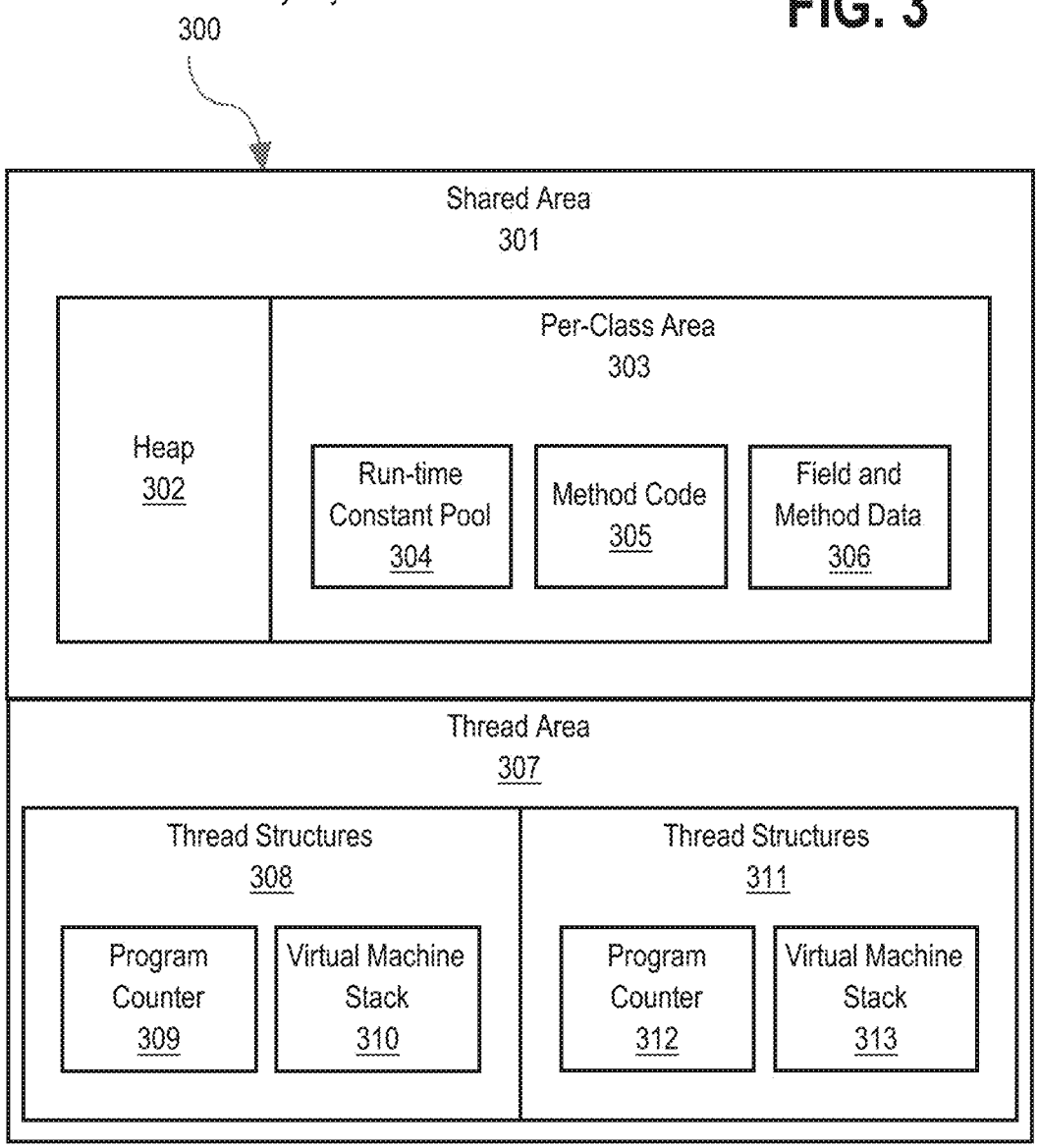
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
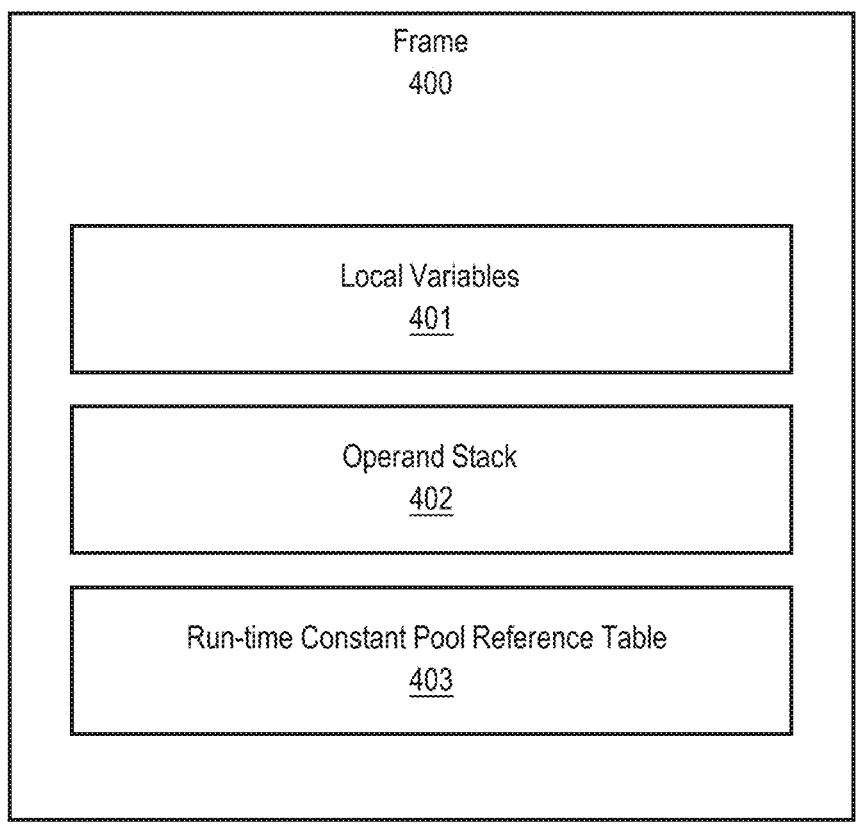
FIG. 4 illustrates an example frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking a class loader 107 which loads an initial class. Examples of class loaders 107 include a boot class loader, an extension class loader, and an application class loader. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Garbage Collection

Figure 5:
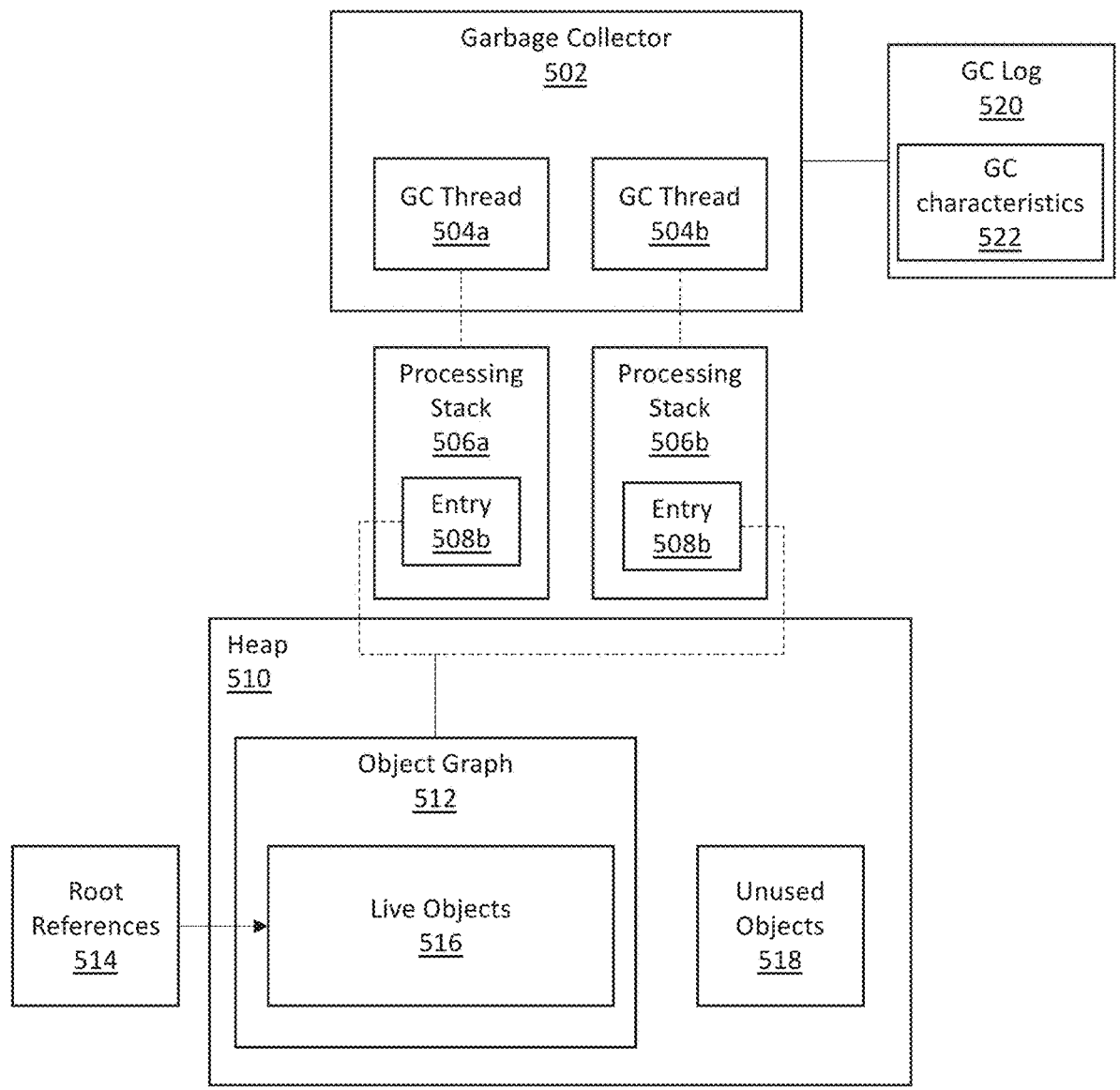
FIG. 5 illustrates an example garbage collection system for processing objects in a heap, in accordance with an embodiment.

FIG. 5 illustrates an example garbage collection system for processing objects in a heap, in accordance with an embodiment. FIG. 5 includes garbage collector (GC) 502, GC threads 504*a-b*, processing stacks 506*a-b*, entries 508*a-b*, heap 510, object graph 512, root references 514, live objects 516, and unused objects 518.

As described above, a heap 510 (or heap 302 described above) represents the run-time data area from which memory for class instances and arrays is allocated. The heap 510 stores objects that are created during execution of a program. The heap 510 stores both live objects 516 and unused objects 518.

An object stored in a heap 510 may be a normal object, an object array, or another type of object. A normal object is a class instance. A class instance is explicitly created by a class instance creation expression. An object array is a container object that holds a fixed number of values of a single type. The object array is a particular set of normal objects. An object array is explicitly created by an array creation expression. The length of the object array is established when the object array is created and is thereafter fixed. Each element or item in the object array is accessed by a numerical index, beginning with the index zero (0). As an example, a program may include the following pseudo-code:

String myobject="11/15/2011";
String[ ] myarray=new String[2];
myarray[0]="11/16/2011";
myarray[1]="11/17/2011";

In this example, myobject is a normal object whose type is String and whose value is "11/15/2011." Further, myarray is an object array that holds two elements, each of which is associated with a type of String.myarray is a set of two normal object references whose type is String. The value of the object referenced by the first element is "11/16/2011." The value of the object referenced by the second element is "11/17/2011."

In an embodiment, an object graph 512 is a graph including nodes and edges. A node represents a live object 516. An edge represents a reference from one live object 516 to another live object 516. The root nodes of the object graph 512 include objects pointed to by root references 514. The remaining nodes of the object graph 512 include objects pointed to by another live object.

In an embodiment, a root reference 514 is a pointer to an object from which a traversal of an object graph 512 begins. A garbage collector 502 begins traversing an object graph 512 at a particular object referenced by a root reference 514. The garbage collector 502 identifies the particular object as a live object 516. The garbage collector 502 traces the particular object to identify other objects referenced by the particular object. The garbage collector 502 identifies the other objects referenced by the particular object as live objects 516. The root references 514 used by a garbage collector 502 may be determined by analyzing registers, global fields, and stack frames at the moment when a garbage collection cycle is triggered. Examples of objects referenced by root references 514 include a class loaded by an application class loader, a live thread (such as thread structures 308-311), and a local variable or parameter (such as local variables 401 and/or operand stack 402).

In an embodiment, a live object 516 (also referred to as an "in use object") refers to an object that is currently being referenced by an executing program. The program includes at least one reference to the live object 516. A live object 516 is an object that is reachable from an object referenced by a root reference 514.

In an embodiment, an unused object 518 (also referred to as an "unreferenced object" or a "dead object") refers to an object that is no longer referenced by any part of the executing program. The unused object 518 may be removed from memory. The memory originally used to store the unused object 518 may be reclaimed to store new live objects 516.

In one or more embodiments, a garbage collector 502 refers to hardware and/or software configured to identify and remove unused objects 518 stored in a heap 510. The garbage collector 502 may perform a garbage collection cycle at a scheduled interval and/or upon an event trigger. As an example, when a heap (or a region thereof) reaches a threshold allocation, the garbage collector 502 may perform a garbage collection cycle to remove unused objects 518 stored at the heap (or a region thereof).

A garbage collector 502 may include one or more GC threads 504*a-b* to perform operations in parallel. A GC thread identifies live objects 516 by tracing through an object graph 512. After identifying live objects 516, the GC thread performs various operations and/or algorithms to remove unused objects 518. Specific operations performed in removing unused object depends on the type of garbage collector 502 used.

As an example, one type of garbage collector 502 is a copying collector. The copying collector uses at least two separately defined address spaces of the heap, referred to as a "from-space" and a "to-space." The copying collector identifies live objects 516 stored within an area defined as a from-space. The copying collector copies the live objects 516 to another area defined as a to-space. After all live objects 516 are copied from the from-space to the to-space, the area defined as the from-space is reclaimed. New memory allocation may begin at the first location of the original from-space.

As another example, another type of garbage collector 502 is a mark-and-sweep collector. The mark-and-sweep collector utilizes at least two phases: a mark phase and a sweep phase. During the mark phase, the mark-and-sweep collector marks each live object 516 with a "live" bit. The live bit may be, for example, a bit within an object header of the live object 516. During the sweep phase, the mark-and-sweep collector traverses the heap to identify all non-marked chunks of consecutive memory address spaces. The mark-and-sweep collector links together the non-marked chunks into organized free lists. The non-marked chunks are reclaimed. New memory allocation is performed using the free lists. A new object may be stored in a memory chunk identified from the free lists.

The mark-and-sweep collector may be implemented as a parallel collector. The parallel collector includes multiple GC threads 504*a-b* working in parallel through the mark and sweep phases.

Additionally or alternatively, the mark-and-sweep collector may be implemented as a concurrent collector. At least some operations of a concurrent collector are performed while the executing program or application continues to run. Example stages of a concurrent collector include:

Stage 1: Identify the objects referenced by root references (this is not concurrent with the executing program)

Stage 2: Mark reachable objects from the objects referenced by the root references (this is concurrent)

Stage 3: Identify objects that have been modified as part of the execution of the program during Stage 2 (this is concurrent)

Stage 4: Re-mark the objects identified at Stage 3 (this is not concurrent)

Stage 5: Sweep the heap to obtain free lists and reclaim memory (this is concurrent)

As another example, another type of garbage collector 502 is a partially concurrent collector that also attempts to compact reclaimed memory areas. The heap is partitioned into a set of equally sized heap regions, each a contiguous range of virtual memory. The partially concurrent collector performs a concurrent global marking phase to determine the liveness of objects throughout the heap. After the marking phase completes, the partially concurrent collector identifies regions that are mostly empty. The partially concurrent collector collects these regions first, which often yields a large amount of free space. The partially concurrent collector concentrates its collection and compaction activity on the areas of the heap that are likely to be full of reclaimable objects, that is, garbage. The partially concurrent collector copies objects from one or more regions of the heap to a single region on the heap, and in the process both compacts and frees up memory. This evacuation is performed in parallel on multiprocessors to decrease pause times and increase throughput.

The partially concurrent collector pauses the executing application during one or more stages of the garbage collection cycle. The partially concurrent collector pauses the executing application to copy live objects to new regions. Additionally or alternatively, the partially concurrent collector pauses the executing application to identify and mark objects that have been modified, as part of the execution of the program, since start of the initial marking. Additionally or alternatively, the partially concurrent collector pauses the executing application to perform a cleanup phase, including identifying empty regions and determining old regions that are candidates for the next collection.

A heap may be separated into different regions. A first region stores objects that have not yet satisfied a criteria for being promoted from the first region to a second region; a second region stores objects that have satisfied the criteria for being promoted from the first region to the second region. Different types of garbage collectors 502 may be used for the different regions. Different GC processes may apply to the different regions. As an example, a heap may include a young generation space and an old generation space. A copying collector may perform garbage collection for the young generation space. The young generation space is separated into an Eden space and two survivor spaces. Objects are initially allocated in the Eden space. A GC cycle is triggered when the Eden space is full. Live objects 516 are copied from the Eden space to one of the survivor spaces, for example survivor space 1. At the next GC cycle, live objects 516 in the Eden space are copied to the other survivor space, for example survivor space 2. Live objects 516 in survivor space 1 are also copied to survivor space 2. Each time a live object 516 is copied, the live object 516 may be referred to as surviving a GC cycle. When a live object 516 survives at least a threshold number of GC cycles, the live object 516 is promoted from the young generation space to the old generation space.

Each GC thread is associated with a processing stack (such as processing stack 506a or 506b). As described above, a GC thread identifies live objects 516 by tracing through an object graph 512. The GC thread uses a processing stack to track the traversal of the object graph 512. The processing stack stores references to objects that (a) have been identified as part of the traversal process and (b) have not yet been processed in accordance with a set of garbage collection operations.

A processing stack has a limited number of entries. If a GC thread attempts to store an additional entry in a processing stack after the maximum number of entries has been reached, an error may be generated. Alternatively, if a GC thread attempts to store an additional entry in a processing stack after the maximum number of entries has been reached, the GC thread may allocate a new processing stack. In addition, each entry of the processing stack stores a limited number of bits. As an example, each entry may store a maximum of 64 bits.

Entries stored on a processing stack, which is associated with a particular GC thread, may be distributed to other GC threads for load balancing purposes. As an example, processing stack 506a of GC thread 504a may include ten entries. At the same time, processing stack 506b of GC thread 504b may include zero entries. Five entries from processing stack 506a may be distributed to GC thread 504b. GC thread 504b, rather than GC thread 504a, processes the entries distributed from processing stack 506a. As a result, each of GC thread 504a and GC thread 504b processes five entries. As illustrated in this example, the loads of GC thread 504a and GC thread 504b are thereby balanced.

In one or more embodiments, as the GC 502 performs a GC cycle, the GC characteristics 522 are detected and/or obtained. GC characteristics 522 include both static characteristics (characteristics that are fixed at the beginning of a VM) and dynamic characteristics (characteristics that change during a runtime of a program or application). Static GC characteristics include, for example, a maximum memory size of a young generation space, a minimum memory size of a young generation space, a maximum memory size of an old generation space, a minimum memory size of an old generation space, and a ratio of the memory size of a young generation space to the memory size of an old generation space. Dynamic GC characteristics include, for example, a memory size of a portion of a heap (or a region thereof) that is allocated before a GC cycle; a memory size of a portion of a heap (or region thereof) that is allocated after a GC cycle; a number of objects that are promoted from one region to another region during a GC cycle. A memory size of a portion of a heap that is allocated before a GC cycle may also be referred to herein as "size of allocated heap before GC." A memory size of a portion of a young generation space within a heap that is allocated before a GC cycle may also be referred to herein as "size of allocated young generation before GC."

A GC log 520 including GC characteristics 522 is generated. A GC 502 may generate the GC log 520 during a runtime of a program or application. Additionally or alternatively, the GC 502 may generate the GC log 520 after execution of the program of application has ended.

4. Configuration System Architecture

Figure 6:
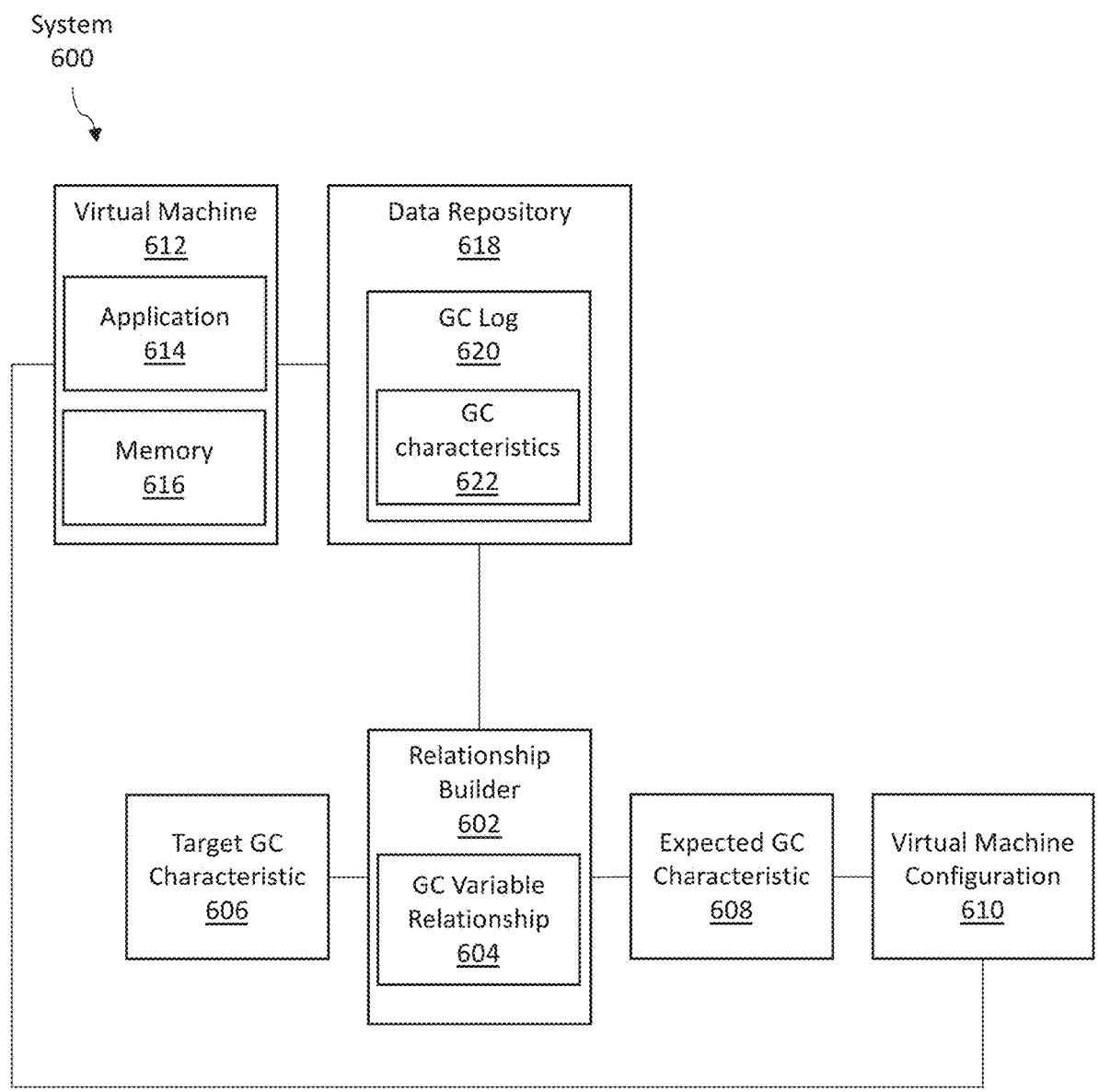
FIG. 6 illustrates an example configuration system, in accordance with one or more embodiments.

FIG. 6 illustrates an example configuration system, in accordance with one or more embodiments. As illustrated in FIG. 6, a configuration system 600 includes a relationship builder 502, a virtual machine 612, and a data repository 618. In one or more embodiments, the system 600 may include more or fewer components than the components illustrated in FIG. 6. The components illustrated in FIG. 6 may be local to or remote from each other. The components illustrated in FIG. 6 may be implemented in software and/or hardware. Each component may be distributed over multiple applications and/or machines. Multiple components may be combined into one application and/or machine. Operations described with respect to one component may instead be performed by another component.

In one or more embodiments, a virtual machine 612 is an emulation of a computer system. A virtual machine 612 functions as a separate computer system from the computer system (such as, a physical machine) on which the virtual machine 612 is executed. A virtual machine 612 provides functionality of a physical computer, such as executing one or more applications 614. A virtual machine 612 may be implemented using specialized hardware, software, or a combination. A virtual machine may be referred to as a "guest," while the computing environment on which the virtual machine is executed may be referred to as a "host." Multiple virtual machines may concurrently execute within a single host.

As described above, a virtual machine 612 is configured to execute one or more applications 614. An application 614 is a set of instructions that may be executed on a computer. As an example, an application or group of applications may be designed for use by an end user. The application may provide a user interface, which permits the user to perform a group of coordinated functions, tasks, or activities using the application.

Moreover, a virtual machine 612 is associated with a memory 616. The memory 616 may be organized according to a virtual machine memory layout 300, as described above with reference to FIG. 3. A portion of the memory 616 is statically allocated during a compilation of an application 614. Another portion of the memory 616 is dynamically allocated during a runtime of an application 614. The dynamically allocated portion of memory 616 may be referred to as a "heap." The heap is dynamically allocated to objects and/or other items as the objects and/or items are instantiated and/or generated throughout an execution of an application 614.

As described above with reference to FIG. 5, a garbage collection process, is executed on a memory 616 (and/or a region thereof) of a virtual machine 612. For purposes of the garbage collection process, the memory 616 may include a young generation space and an old generation space. The young generation space may further be divided into an Eden space and survivor spaces.

A virtual machine 612 is associated with a virtual machine configuration 610. A virtual machine configuration 610 specifies certain attributes of a virtual machine 612, such as a memory size of a memory 616 (and/or a memory size of any region of the memory 616, such as, a heap, a young generation space within a heap, an Eden space within a young generation space of a heap), a type of garbage collection algorithm to be executed on the memory 616 (and/or each region thereof), and a criteria for promoting an object from a young generation space to an old generation space. A virtual machine configuration 610 may be determined based on an expected GC characteristic 608, as further described below with reference to FIG. 8.

Some virtual machine configurations 610 may be applied to a virtual machine 612 while the virtual machine 612 continues to execute an application 614. The virtual machine 612 may pause execution of the application 614 for a new virtual machine configuration 610 to apply, however the virtual machine 612 may resume and continue execution of the application 614 after the reconfiguration without losing any state information for the application 614. Additionally or alternatively, some virtual machine configurations 610 may be applied to a virtual machine 612 only at the startup of the virtual machine 612. Hence, to reconfigure a virtual machine 612, the virtual machine 612 must be terminated and thereafter restarted using the new virtual machine configuration 610.

In one or more embodiments, a data repository 618 is any type of storage unit and/or device (e.g., a file system, database, collection of tables, or any other storage mechanism) for storing data. Further, a data repository 618 may include multiple different storage units and/or devices. The multiple different storage units and/or devices may or may not be of the same type or located at the same physical site. Further, a data repository 618 may be implemented or may execute on the same computing system as a virtual machine 612 and/or relationship builder 602. Alternatively or additionally, a data repository 618 may be implemented or executed on a computing system separate from a virtual machine 612 and/or relationship builder 602. The data repository 618 may be communicatively coupled to the virtual machine 612 and/or relationship builder 602 via a direct connection or via a network.

Information describing a garbage collection (GC) log 620 and/or GC characteristics 622 may be implemented across any of components within the system 600. However, this information is illustrated within the data repository 618 for purposes of clarity and explanation.

In one or more embodiments, a GC characteristic 622 is a characteristic associated with a GC cycle that is executed on a memory 616 of a virtual machine 612. A GC characteristic 622 specifies a particular value for a GC variable. As an example, a GC characteristic may be that 113 MB of a young generation space is allocated before a particular GC cycle. In this case, the value is 113 MB, and the GC variable is "size of allocated young generation before GC cycle." A GC characteristic 622 may be fixed at the startup of a virtual machine 612, and therefore be the same through all GC cycles. Additionally or alternatively, a GC characteristic 622 may vary over time, and therefore not necessarily be the same through multiple GC cycles. Examples of GC variables include an execution time of a GC cycle, a size of allocated heap (and/or region thereof) before GC cycle, a size of allocated heap (and/or a region thereof) after GC cycle, a total memory size of a heap (and/or a region thereof), a number of objects promoted from a young generation space to an old generation space during a GC cycle, a duration of a GC cycle, and a duration in which an application was paused for execution a GC cycle.

GC characteristics 622 detected over a time period may be aggregated. A cumulative GC characteristic is a sum of the values specified by a set of GC characteristics detected over a time period. As an example, from 10:00 to 10:01, five GC cycles may have been executed. The pause time (in seconds) of each GC cycle is: 0.10, 0.20, 0.10, 0.08, and 0.07. The cumulative pause time, from 10:00 to 10:01, is thus 0.10+0.20+0.10+0.08+0.07=0.55 seconds. An average GC characteristic is an average of the values specified by a set of GC characteristics detected over a time period. As an example, from 10:00 to 10:01, five GC cycles may have been executed. The memory size of a heap that is allocated before each GC cycle is: 113 MB, 90 MB, 113 MB, 113 MB, and 90 MB. The average memory size of the heap that is allocated before each GC cycle, from 10:00 to 10:01, is thus (113+90+113+113+90)/5=103.8 MB.

In one or more embodiments, a GC log 620 is a log of GC characteristics 622. A GC log 620 may be generated as an application executes. An entry may be added to the GC log 620 at the end of each GC performed on the heap for the application. An entry may be added to the GC log 620 at regular time intervals during execution of the application. Additionally or alternatively, a GC log 620 may be generated at the termination of an application.

In one or more embodiments, a target GC characteristic 606 is a GC characteristic that is desired. A target GC characteristic 606 may be a cumulative GC characteristic per time interval and/or an average GC characteristic per time interval. As an example, a target GC characteristic may be a target cumulative pause time of 0.15 seconds per minute.

In one or more embodiments, an expected GC characteristic 608 is a GC characteristic that is expected and/or predicted to occur, if one or more target GC characteristics 606 are to be achieved. A target GC characteristic 606 may be a cumulative GC characteristic per time interval and/or an average GC characteristic per time interval. As an example, a target GC characteristic may be a target cumulative pause time of 0.15 seconds per minute. If the target GC characteristic occurs, then an expected size of allocated young generation before GC cycle may be 120 MB.

In one or more embodiments, a relationship builder 602 refers to hardware and/or software configured to perform operations described herein for determining a GC variable relationship 604 based on GC characteristics 622. Examples of operations for determining a GC variable relationship 604 based on GC characteristics are further described below with reference to FIG. 7.

In one or more embodiments, a GC variable relationship 604 is a relationship that links a set of GC variables for a particular application 614, based on GC characteristics 622 associated with the particular application 614. Different GC variable relationships 604 may be associated with different applications 614. A GC variable relationship 604 may specify a particular GC variable as a function of other GC variables. The function may be, for example, a polynomial function of degree 3. The function may be a best fit to a set of GC characteristics detected during execution of an application.

As an example, a GC variable relationship may indicate that a size of allocated young generation before GC cycle is inversely proportional to a cumulative pause time. The greater the allocated young generation size before GC cycle, the lesser the cumulative pause time.

As another example, a GC variable relationship may indicate that an allocated young generation size before GC cycle is inversely proportional to a cumulative pause time up to a threshold size. For an allocated young generation size before GC that is greater than the threshold size, the allocated young generation size before GC may be proportional to the cumulative pause time.

In one or more embodiments, one or more components (such as, a relationship builder 602) illustrated in FIG. 6 are configured to determine a VM configuration for achieving a target GC characteristic, using a GC variable relationship 604 and/or to apply a VM configuration 610 to a VM 612. Alternatively, a system 600 includes additional components configured to determine a VM configuration for achieving a target GC characteristic, using a GC variable relationship 604 and/or to apply a VM configuration 610 to a VM 612. Examples of operations for determining a VM configuration for achieving a target GC characteristic, using a GC variable relationship 604, are described below with reference to FIG. 8. Examples of operations for applying a VM configuration 610 to a VM 612 are described below with reference to FIG. 9.

In an embodiment, a relationship builder 602 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a mainframe, a television, a content receiver, a set-top box, a printer, a mobile handset, a smartphone, a personal digital assistant (PDA).

5. Determining a GC Variable Relationship Based on GC Characteristics

Figure 7:
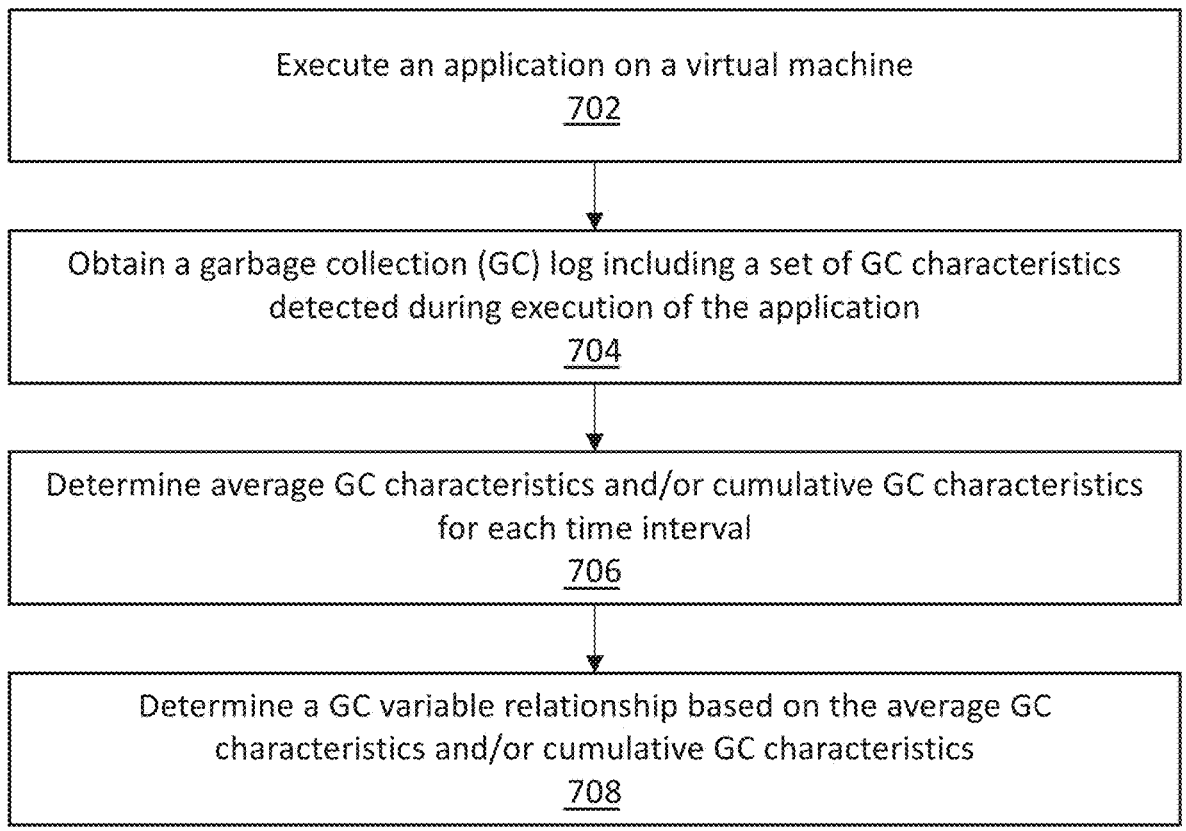
FIG. 7 illustrates an example set of operations for determining a garbage collection (GC) variable relationship based on GC characteristics, in accordance with one or more embodiments.

FIG. 7 illustrates an example set of operations for determining a garbage collection (GC) variable relationship based on GC characteristics, in accordance with one or more embodiments. One or more operations illustrated in FIG. 7 may be modified, rearranged, or omitted all together. Accordingly, the particular sequence of operations illustrated in FIG. 7 should not be construed as limiting the scope of one or more embodiments.

One or more embodiments include executing an application on a virtual machine (Operation 702). A virtual machine is initiated with an initial VM configuration. The virtual machine executes the application using the initial VM configuration.

One or more embodiments include obtaining a garbage collection (GC) log including a set of GC characteristics detected during execution of the application (Operation 704). During execution of the application on the VM, one or more GC cycles are performed on the heap of the VM. GC characteristics are detected for each of the GC cycles. The GC characteristics are compiled into a GC log. A configuration system obtains the GC log from the VM.

One or more embodiments include determining average GC characteristics and/or cumulative GC characteristics for each time interval (Operation 706). The configuration system aggregates the GC characteristics from the GC log for each time interval.

In an embodiment, the configuration system determines cumulative GC characteristics for each time interval. As an example, a GC log may indicate times of execution and pause times of each GC cycle, as follows:
time of execution 10:00:03; pause time 0.10 seconds;
time of execution 10:00:41; pause time 0.20 seconds;
time of execution 10:00:57; pause time 0.10 seconds;
time of execution 10:01:40; pause time 0.08 seconds;
time of execution 10:01:58; pause time 0.07 seconds.

Each time interval, for aggregating GC characteristics, may be one minute. Hence, a first time interval is 10:00:00 to 10:00:59, and a second time interval is 10:01:00 to 10:01:59.

A cumulative GC characteristic may be a GC cycle count. There are three GC cycles occurring within the first time interval (occurring at 10:00:03, 10:00:41, and 10:00:57, respectively). Therefore, the GC cycle count for the first time interval is three. There are two GC cycles occurring within the second time interval (occurring at 10:01:40, and 10:01:58, respectively). Therefore, the GC cycle count for the second time interval is two.

Another cumulative GC characteristic may be a cumulative pause time. The cumulative pause time, for the first time interval, is 0.10+0.20+0.10=0.30 seconds. The cumulative pause time, for the second time interval, is 0.08+0.07=0.15 seconds.

Additionally or alternatively, the configuration system determines average GC characteristics for each time interval. As an example, a GC log may indicate execution times of each GC cycle and sizes of allocated heap before each GC cycle, as follows:
time of execution 10:00:03; allocated heap size before GC cycle 113 MB;
time of execution 10:00:41; allocated heap size before GC cycle 113 MB;
time of execution 10:00:57; allocated heap size before GC cycle 155 MB;
time of execution 10:01:40; allocated heap size before GC cycle 155 MB;
time of execution 10:01:58; allocated heap size before GC cycle 155 MB.

Each time interval, for aggregating GC characteristics, may be one minute. Hence, a first time interval is 10:00:00 to 10:00:59, and a second time interval is 10:01:00 to 10:01:59.

An average GC characteristic may be an average allocated heap size before GC cycle. The average allocated heap size, for the first time interval, is (113+113+155)/3=113.67 MB. The average allocated heap size, for the second time interval, is (155+155)/2=155 MB.

One or more embodiments include determining a GC variable relationship based on the average GC characteristics and/or cumulative GC characteristics (Operation 708). The configuration system determines a function that best fits the average GC characteristics and/or cumulative GC characteristics determined at Operation 706. The configuration system may apply a regression analysis to the average GC characteristics and/or cumulative GC characteristics to determine the function. Examples of regression analysis include linear regression, nonlinear regression, Bayesian regression, least absolute deviations regression, nonparametric regression, and distance metric learning regression. The function may of any function type, such as a polynomial function (of any degree). The configuration system stores the GC variable relationship in a data repository. The GC variable relationship may define one aggregated GC characteristic as a function of one or more other aggregated GC characteristics. The GC variable relationship may be used to determine an expected GC characteristic given a target GC characteristic.

Figure 8:
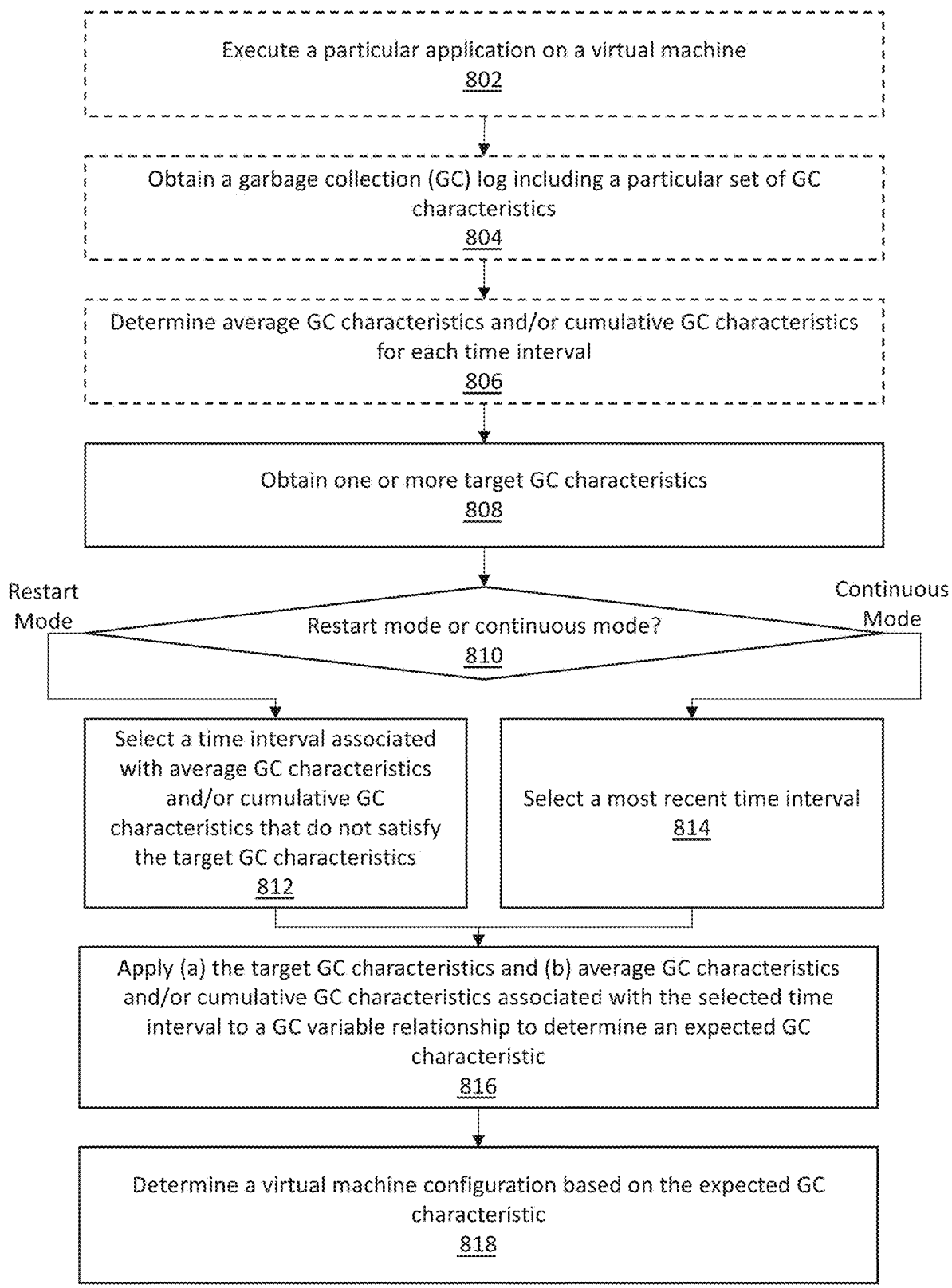
FIG. 8 illustrates an example set of operations for determining a virtual machine (VM) configuration for achieving a target GC characteristic, using a GC variable relationship, in accordance with one or more embodiments.

6. Determining a VM Configuration for Achieving a Target GC Characteristic Using a GC Variable Relationship FIG. 8 illustrates an example set of operations for determining a virtual machine (VM) configuration for achieving a target GC characteristic, using a GC variable relationship, in accordance with one or more embodiments. One or more operations illustrated in FIG. 8 may be modified, rearranged, or omitted all together. Accordingly, the particular sequence of operations illustrated in FIG. 8 should not be construed as limiting the scope of one or more embodiments.

One or more embodiments include executing an application on a virtual machine (Operation 802). Examples of operations for executing an application on a virtual machine are described above with reference to Operation 702 of FIG. 7.

One or more embodiments include obtaining a garbage collection (GC) log including a set of GC characteristics detected during execution of the application (Operation 804). Examples of operations for obtaining a GC log including a set of GC characteristics are described above with reference to Operation 704 of FIG. 7.

One or more embodiments include determining average GC characteristics and/or cumulative GC characteristics for each time interval (Operation 806). Examples of operations for determining average GC characteristics and/or cumulative GC characteristics for each time interval are described above with reference to Operation 706 of FIG. 7.

In one or more embodiments, Operations 702-706 are performed, as described above with reference to FIG. 7. Operations 802-806 are not necessarily performed. Rather the average GC characteristics and/or cumulative GC characteristics, for each time interval, determined at Operation 706, are used for at least two purposes: (a) generating a GC variable relationship, as described at Operation 708, and (b) serving as inputs to the GC variable relationship, as described below with reference to Operations 812-816. Hence, a single execution of the application at Operation 706 is sufficient for determining a virtual machine configuration, as described at Operation 818.

In alternative embodiments, Operations 702-706 are performed to obtain average GC characteristics and/or cumulative GC characteristics, for each time interval, which are used for generating a GC variable relationship, as described at Operation 708. Separately, Operations 802, Operation 804, and/or Operation 806 are performed to obtain average GC characteristics and/or cumulative GC characteristics, for each time interval, which serve as inputs to the GC variable relationship, as described below with reference to Operations 812-816. Hence, two sets of average GC characteristics and/or cumulative GC characteristics may be obtained (once for Operation 706 and once for Operation 806).

Where Operations 702-706 and Operations 802-806 refer to distinct operations that are separately performed, there may be a single execution of an application or multiple executions of the application. In an embodiment, Operation 802 may refer to a same continuous execution of an application from Operation 702. The application is not necessarily terminated and/or paused between execution of Operation 702 and Operation 802. A single execution of the application obtains two different GC logs and/or two different sets of average GC characteristics and/or cumulative GC characteristics. In an alternative embodiment, an application may be executed at Operation 702. Thereafter the application may be terminated. The application may be re-executed at Operation 802. The application may be re-executed on the same virtual machine as Operation 702 or a different virtual machine from Operation 702.

One or more embodiments include obtaining one or more target GC characteristics (Operation 808). The configuration system obtains one or more target GC characteristics. The target GC characteristics may be obtained as user input using a user interface. Additionally or alternatively, the target GC characteristics may be obtained from another application using an application programming interface.

One or more embodiments include determining whether the configuration system is operating under restart mode or continuous mode (Operation 810). The mode of the configuration system may be specified by user input and/or another application.

Under restart mode, the configuration system restarts a virtual machine in order to apply a new virtual machine configuration, as further described below with reference to FIG. 9. Under continuous mode, the configuration system need not restart a virtual machine in order to apply a new virtual machine configuration, as further described below with reference to FIG. 9.

Under restart mode, one or more embodiments include selecting a time interval associated with average GC characteristics and/or cumulative GC characteristics that do not satisfy the target GC characteristics (Operation 812). The configuration system identifies the average GC characteristics and/or cumulative GC characteristics, for each time interval, determined at Operation 806 (and/or determined at Operation 706). The configuration system compares (a) the average GC characteristics and/or cumulative GC characteristics and (b) the target GC characteristic. The configuration system determines whether any average GC characteristics and/or cumulative GC characteristics do not satisfy the target GC characteristic. The configuration system identifies a time interval corresponding to the average GC characteristics and/or cumulative GC characteristics that do not satisfy the target GC characteristic.

As an example, a target GC characteristic may be a target cumulative pause time of 0.15 seconds per minute. Cumulative pause times, for each one-minute interval, may be determined from a GC log, as follows: 0.11 seconds, 0.09 seconds, 0.19 seconds, 0.10 seconds. In this example, the fourth time interval is associated with a cumulative pause time of 0.19 seconds, which exceeds the target cumulative pause time of 0.15 seconds. Therefore, the fourth time interval may be selected.

As another example, a target GC characteristics may be a target GC cycle count of 10 per minute. GC cycle counts, for each one-minute interval, may be determined from a GC log, as follows: 6, 7, 12, 8, 11. In this example, the third time interval is associated with a GC cycle count of 12, which exceeds the target GC cycle count of 10. Moreover, the fifth time interval is associated with a GC cycle count of 11, which exceeds the target GC cycle count of 10. Hence, either the third time interval or the fifth time interval may be selected.

Under continuous mode, one or more embodiments include selecting a most recent time interval (Operation 814). The configuration system identifies the average GC characteristics and/or cumulative GC characteristics, for each time interval, determined at Operation 806 (and/or determined at Operation 706). The configuration system identifies the most recent time interval for which GC characteristics have been obtained for an executing application. Additionally or alternatively, the configuration system identifies the most recent time interval for which average GC characteristics and/or cumulative GC characteristics have been determined for an executing application.

As an example, a virtual machine may execute a particular application. A GC log may be generated while the application executes. At 10:00:01, a GC cycle may occur. An entry may be added to the GC log with the GC characteristics of the GC cycle at 10:00:01. At 10:00:44, another GC cycle may occur. An entry may be added to the GC log with the GC characteristics of the GC cycle at 10:00:44. At 10:01:53, another GC cycle may occur. An entry may be added to the GC log with the GC characteristics of the GC cycle at 10:01:53. At 10:01:55, a configuration system may attempt to select a most recent time interval for which GC characteristics have been obtained. The most recent time interval may be 10:00:00-10:00:59. Therefore the configuration system may select the time interval 10:00:00-10:00:59, which includes the GC cycles occurring at 10:00:01 and 10:00:44. The configuration system may determine average GC characteristics and/or cumulative GC characteristics for the GC cycles occurring at 10:00:01 and 10:00:44.

In one or more embodiments, additional and/or alternative methods for selecting a time interval may be used. As an example, the configuration system may select a time interval associated with the worst average GC characteristics and/or cumulative GC characteristics. As another example, the configuration system may select a time interval that is a threshold period of time after the start of an execution of an application.

One or more embodiments include applying (a) the target GC characteristics and (b) average GC characteristics and/or cumulative GC characteristics associated with the selected time interval to a GC variable relationship to determine an expected GC characteristic (Operation 816). The configuration system identifies a GC variable relationship, determined at Operation 708. The configuration system identifies the set of GC variables in the GC variable relationship. For GC variables corresponding to the target GC characteristics, the configuration system inputs the values specified by the target GC characteristics into the GC variables. For the remaining GC variables in the GC variable relationship, the configuration system inputs the values specified by the average GC characteristics and/or cumulative GC characteristics associated with the selected time interval. Based on the inputs to the GC variable relationship, the configuration system determines an expected GC characteristic.

As an example, target GC characteristics may include a target cumulative pause time per minute of 0.10 seconds and a target GC count per minute of 5.

A GC variable relationship may specify an allocated young generation size before GC cycle as a function of: cumulative pause time; GC count; allocated young generation size after GC cycle; allocated old generation size before GC cycle; and allocated old generation size after GC cycle. The GC variable relationship may be expressed as follows:
Ybefore=f(P, C, Yafter, Obefore, Oafter);
wherein Ybefore is allocated young generation size before GC cycle, Yafter is allocated young generation size after GC cycle, Obefore is allocated old generation size before GC cycle, Oafter is allocated young generation size after GC cycle, P is cumulative pause time, and C is GC cycle count.

Average GC characteristics and/or cumulative GC characteristics per minute may be determined from a GC log, as follows:

| Interval | Allocated young generation size before GC cycle (MB) | Allocated young generation size after GC cycle (MB) | Allocated old generation size before GC cycle (MB) | Allocated old generation size after GC cycle (MB) | Pause Time (Seconds) | Count |
|---|---|---|---|---|---|---|
| 1 | 113 | 8 | 0 | 0 | 0.12 | 3 |
| 2 | 113 | 9 | 0 | 0 | 0.09 | 1 |
| 3 | 155 | 10 | 10 | 10 | 0.10 | 2 |
| 4 | 155 | 9 | 15 | 14 | 0.20 | 5 |

A configuration system may determine that the fourth interval is associated with (a) a cumulative pause time greater than the target cumulative pause time and (b) a GC cycle count greater than the target GC cycle count. The configuration system may select the fourth interval.

The configuration system may identify P and C as the GC variables corresponding to the target GC characteristics. The configuration system may input the values specified by the target GC characteristics into the GC variables P and C. Hence, the configuration may input 0.10 for P, and 5 for C.

For the remaining GC variables Yafter, Obefore, and Oafter, the configuration system may input the values specified by the average GC characteristics and/or cumulative GC characteristics associated with the fourth time interval. Hence, the configuration system may input 9 for Miter, 15 for Obefore, and 14 for Oafter.

Based on the inputs, the function to be computed is thus: Ybefore=f(0.10, 5, 9, 15, 14). The output of the function may be, for example, 160. The output indicates that the expected allocated young generation size before GC is 160 MB, if the target GC characteristics are to be achieved.

One or more embodiments include determining a virtual machine configuration based on the expected GC characteristic (Operation 818). The configuration system determines a virtual machine configuration based on the expected GC characteristic.

In an embodiment, an expected GC characteristic is an expected size of allocated young generation before GC cycle. The configuration system determines a size of a portion of memory to be designated as a young generation space based on the expected allocated young generation size before GC cycle. The designated young generation size may be equal to or greater than the expected allocated young generation size before GC cycle.

By setting the designated young generation size to be equal to greater than the expected allocated young generation size before GC cycle, the young generation would be large enough to accommodate the expected allocated young generation size before GC cycle. By accommodating the expected allocated young generation size before GC cycle, the target GC characteristic may be achieved.

In an embodiment, an expected GC characteristic is an expected size of allocated old generation before GC cycle. The configuration system determines a size of a portion of memory to be designated as an old generation space based on the expected allocated old generation size before GC cycle. The designated old generation size may be equal to or greater than the expected allocated old generation size before GC cycle.

By setting the designated old generation size to be equal to greater than the expected allocated old generation size before GC cycle, the old generation would be large enough to accommodate the expected allocated old generation size before GC cycle. By accommodating the expected allocated old generation size before GC cycle, the target GC characteristic may be achieved.

Additionally or alternatively, the GC variable relationship may be used to determine other expected GC characteristics. The expected GC characteristics may be used to determine other aspects of a virtual machine configuration.

7. Applying a VM Configuration to a VM

Figure 9:
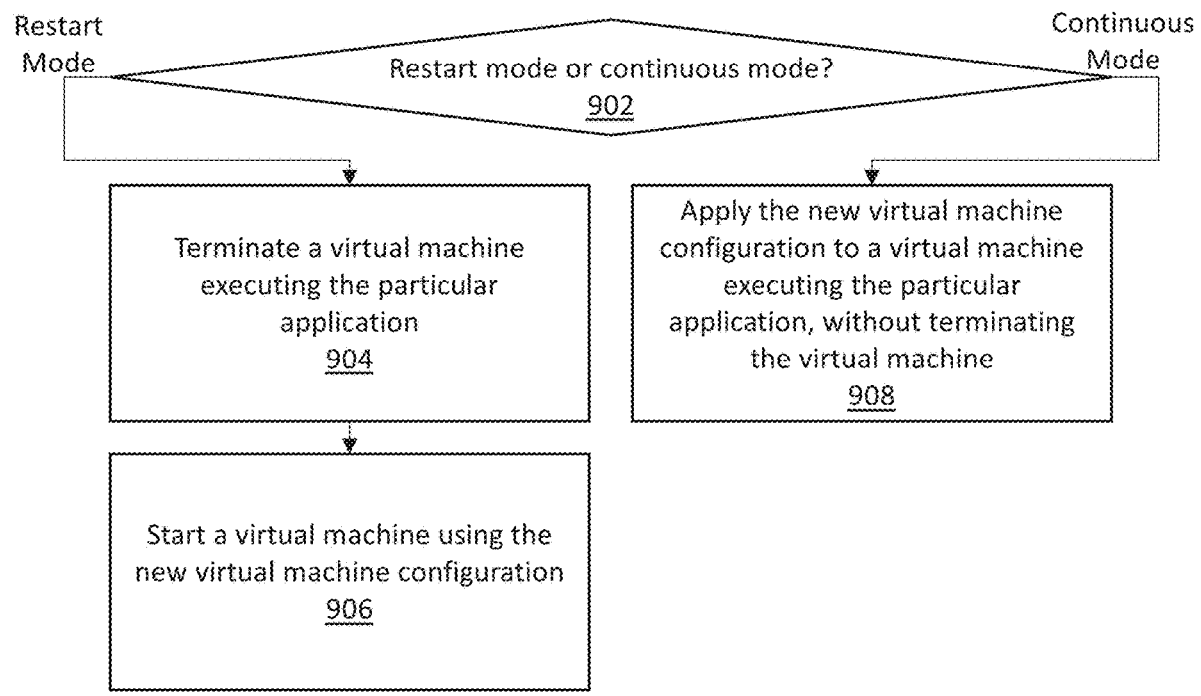
FIG. 9 illustrates an example set of operations for applying a VM configuration to a VM, in accordance with one or more embodiments.

FIG. 9 illustrates an example set of operations for applying a VM configuration to a VM, in accordance with one or more embodiments. One or more operations illustrated in FIG. 9 may be modified, rearranged, or omitted all together. Accordingly, the particular sequence of operations illustrated in FIG. 9 should not be construed as limiting the scope of one or more embodiments.

One or more embodiments include determining whether a configuration system is operating under restart mode or continuous mode (Operation 902). Examples of operations for determining whether a configuration system is operating under restart mode or continuous mode are described above with reference to Operation 810 of FIG. 8.

Under restart mode, one or more embodiments include terminating a virtual machine executing the particular application (Operation 904). The configuration system causes the virtual machine to be terminated. The virtual machine may be permitted to complete processing certain processes. The virtual machine is then stopped. State information of the virtual machine at the time of termination is not necessarily stored.

One or more embodiments include starting a virtual machine using the new virtual machine configuration (Operation 906). The configuration system causes a virtual machine to be started. The virtual machine is started with the new virtual machine configuration, determined at Operation 818 of FIG. 8.

One or more embodiments include applying the new virtual machine configuration to a virtual machine executing the particular application, without terminating the virtual machine (Operation 908). The configuration system causes the new virtual machine configuration, determined at Operation 818 of FIG. 8, to be applied to a virtual machine executing the particular application. The new virtual machine configuration is applied without terminating the virtual machine. In an embodiment, the virtual machine may be paused; however, state information of the virtual machine at the time of the pause is stored. Hence the virtual machine may resume execution of the particular application as if the execution were continuous.

8. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 10A:
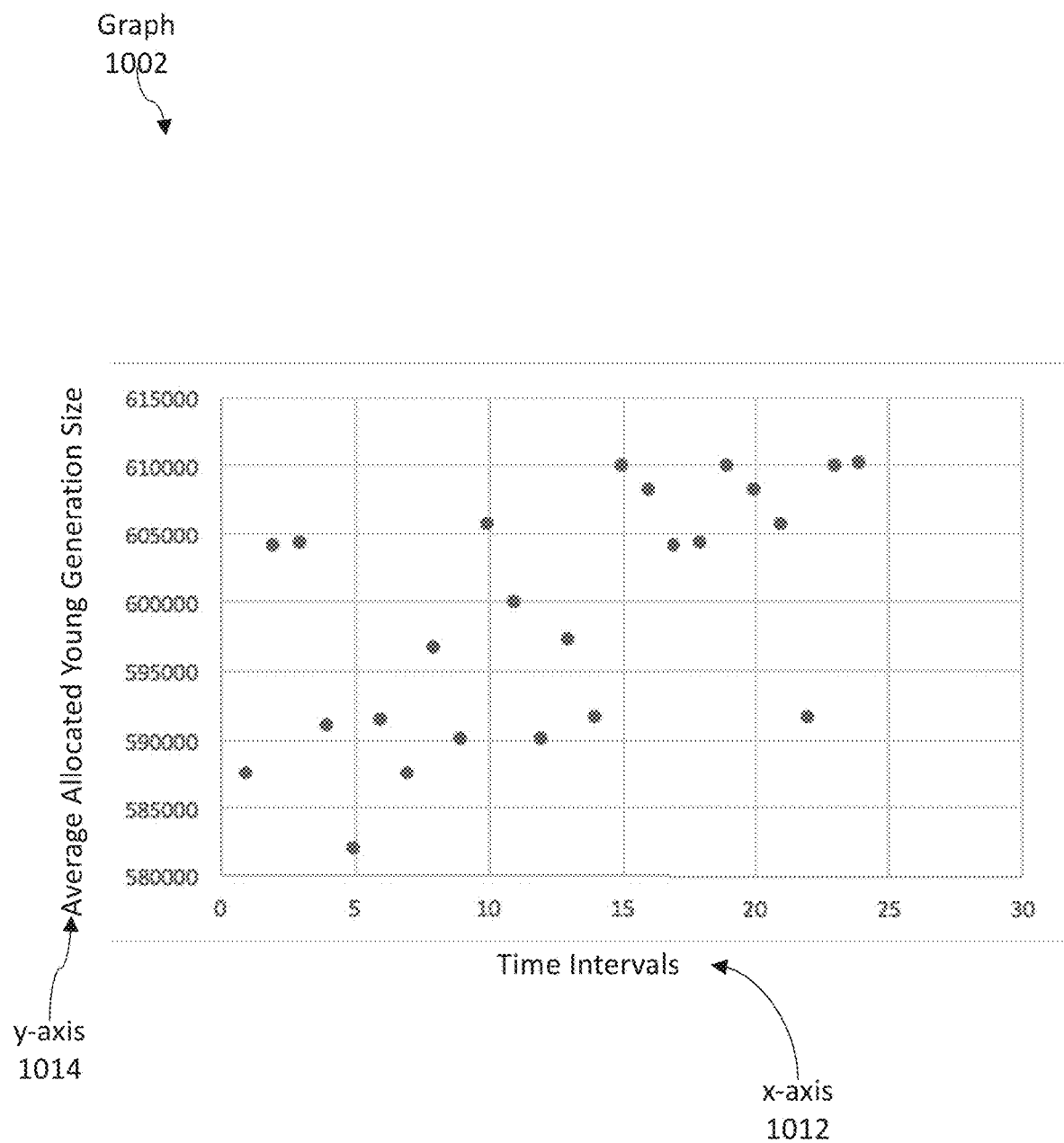
FIGS. 10A-C illustrate an example for determining a GC variable relationship to be used for determining an expected GC characteristic given a target GC characteristic, in accordance with one or more embodiments.
Figure 10B:
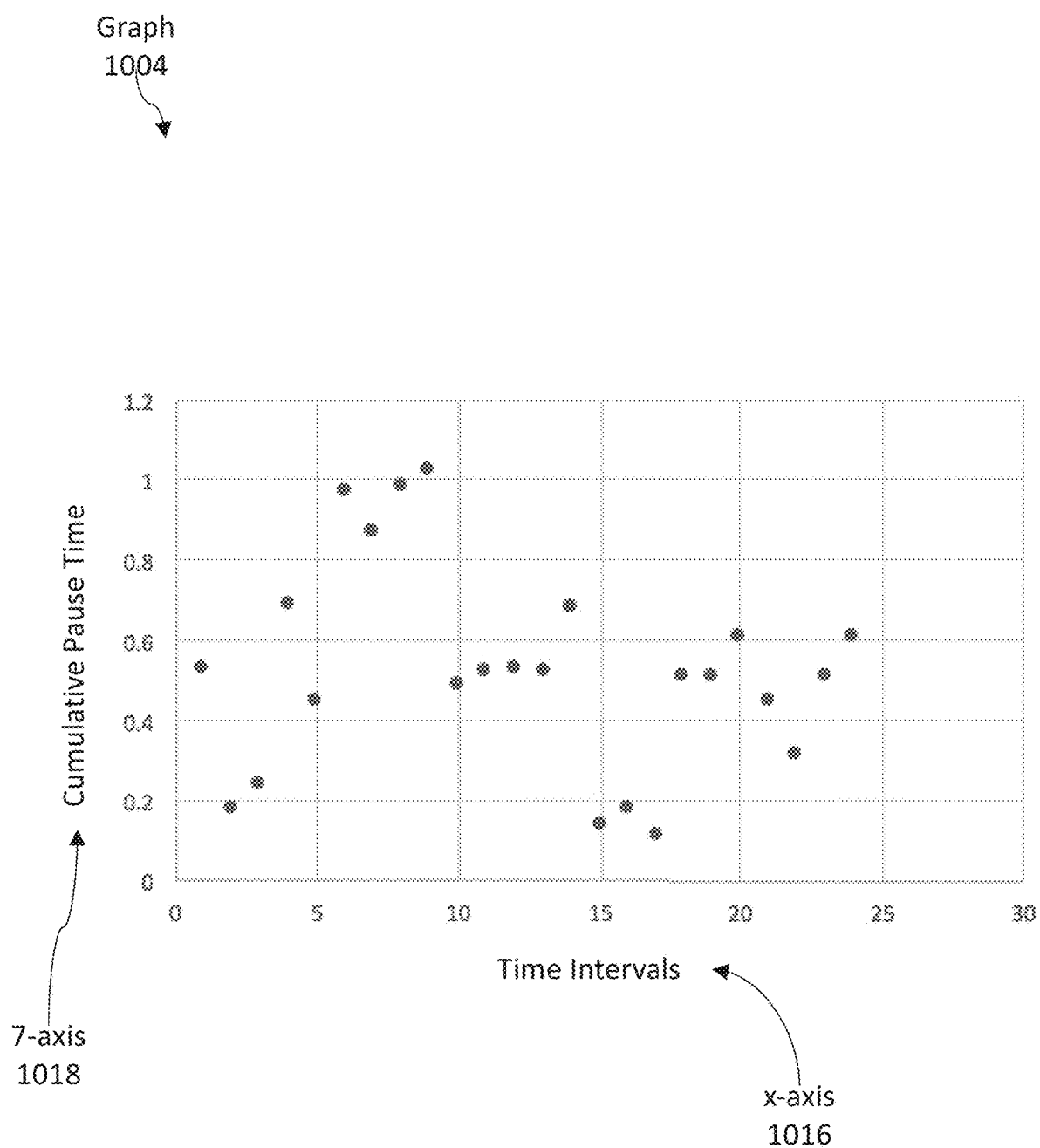
Figure 10C:
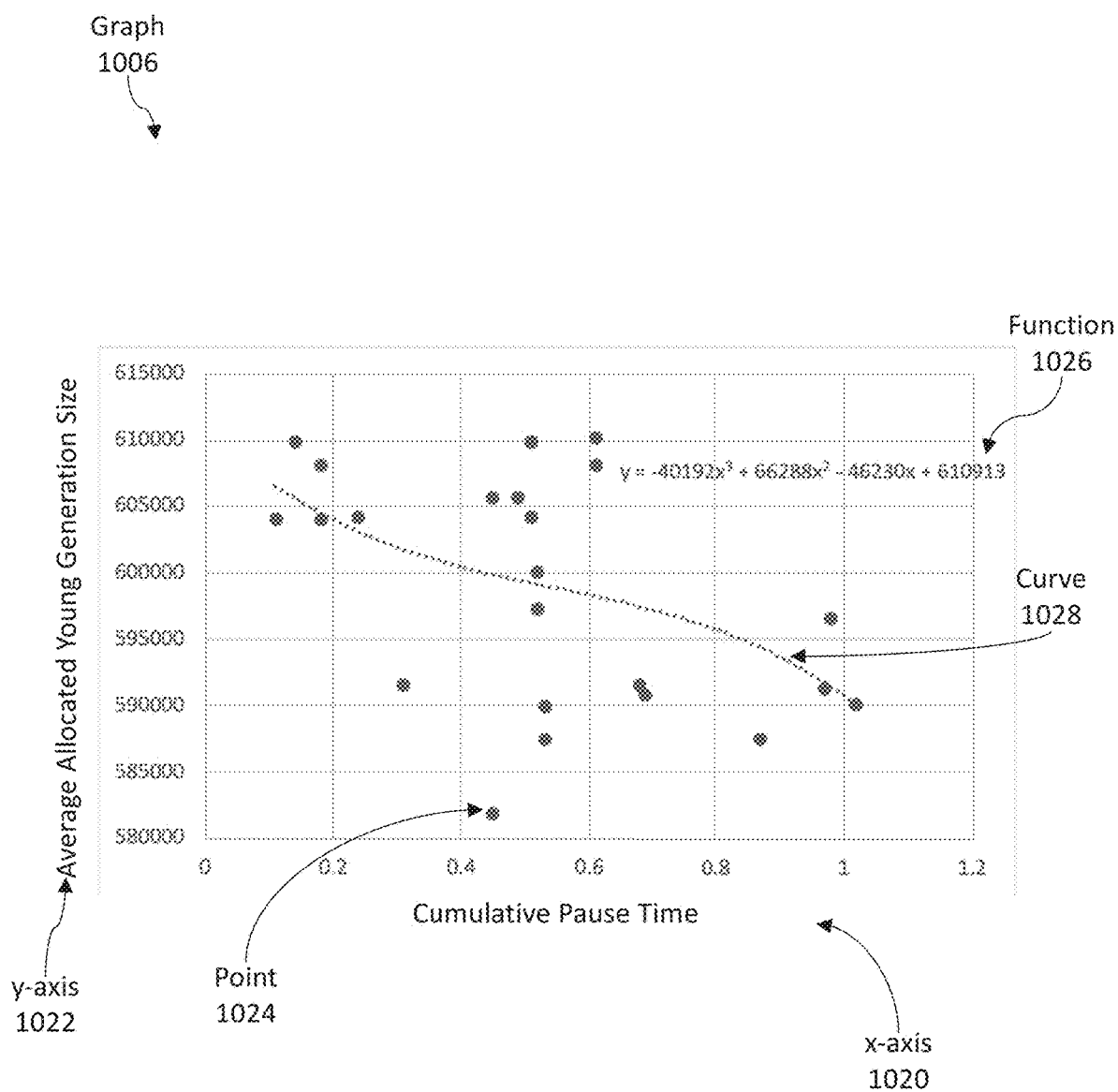

FIGS. 10A-C illustrate an example for determining a GC variable relationship to be used for determining an expected GC characteristic given a target GC characteristic, in accordance with one or more embodiments.

An application is executed on a virtual machine (VM). Memory of the VM is allocated for execution of the application. For example, heap memory is allocated to live objects of the application. One or more GC cycles are performed on the VM memory. GC characteristics are detected and/or collected for each GC cycle. The GC characteristics are compiled into a GC log.

A configuration system obtains the GC log. The configuration system determines aggregated GC characteristics for each time interval. Aggregated GC characteristics may include cumulative GC characteristics and/or average GC characteristics. For example, the aggregated GC characteristics may be as follows:

TABLE 1

| Time Interval | Average Young Occupancy Before GC (MB) | Cumulative Pause Time (Seconds) |
|---|---|---|
| 1 | 587467.3 | 0.53 |
| 2 | 603964.2 | 0.18 |
| 3 | 604085.9 | 0.24 |
| 4 | 590848.2 | 0.69 |
| 5 | 581907.6 | 0.45 |
| 6 | 591233.8 | 0.97 |
| 7 | 587368.5 | 0.87 |
| 8 | 596490.1 | 0.98 |
| 9 | 589988.1 | 1.02 |
| 10 | 605624.2 | 0.49 |
| 11 | 599959.9 | 0.52 |
| 12 | 589892.2 | 0.53 |
| 13 | 597228.4 | 0.52 |
| 14 | 591532.6 | 0.68 |
| 15 | 609764.5 | 0.14 |
| 16 | 608110.7 | 0.18 |
| 17 | 603964.2 | 0.11 |
| 18 | 604085.9 | 0.51 |
| 19 | 609764.5 | 0.51 |
| 20 | 608110.7 | 0.61 |
| 21 | 605624.2 | 0.45 |
| 22 | 591532.6 | 0.31 |
| 23 | 609764.5 | 0.51 |
| 24 | 610110.7 | 0.61 |

Referring to FIG. 10A, graph 1002 is a plot of the average allocated young generation size before GC cycle per time interval. The x-axis 1012 indicates the time interval. The y-axis 1014 indicates the average allocated young generation size before GC cycle.

Referring to FIG. 10B, graph 1004 is a plot of the cumulative pause time per time interval. The x-axis 1016 indicates the time interval. The y-axis 1014 indicates the cumulative pause time.

Referring to FIG. 10C, graph 1006 is a plot of the average allocated young generation size against the cumulative pause time. The x-axis 1020 indicates the cumulative pause time. The y-axis 1022 indicates the average allocated young generation before GC cycle. Each point on graph 1006 represents a cumulative pause time and an average allocated young generation size for a respective time interval. For example, point 1024 corresponds to time interval 5. As indicated in Table 1 above, time interval 5 is associated with an average allocated young generation size of 581907.6 MB and a cumulative pause time of 0.45 s. As shown in graph 1006, point 1024 is associated with an average allocated young generation size of 581907.6 MB and a cumulative pause time of 0.45 s.

Regression analysis is applied to graph 1006 to determine a polynomial of degree 3 that best fits the graph 1006. Function 1026 is determined as the best fit polynomial, $y=-40192x^3+66288x^2-46230x+610913$, where y represents the average allocated young generation before GC cycle and x represents the cumulative pause time. Curve 1028, drawn on graph 1006, is a graphical representation of function 1026. As shown, curve 1028 fits the points of graph 1006. Function 1026 and/or curve 1028 are representations of a GC variable relationship between the cumulative pause time and the average allocated young generation size.

The GC variable relationship may be used to determine an expected GC characteristic, given a target GC characteristic. As an example, a user may determine that a target GC characteristic is a cumulative pause time of 0.58 s. The target pause time of 0.58 s may be input as x to function 1026. Hence, the expected allocated young generation size before GC cycle may be calculated as $y=-40192\times 0.58^3+66288\times 0.58^2-46230\times 0.58+610913=598556.9$ MB.

Based on the expected allocated young generation size before GC cycle of 598556.9 MB, a new VM configuration may be determined. In particular, the configuration system determines a size of a portion of memory to be designated as a young generation space to be greater than or equal to 598556.9 MB. The configuration system may determine a new VM configuration specifying that a portion of memory to be designated as a young generation space is 598557.0 MB.

The configuration system may apply the new VM configuration, with the 598557.0 MB memory designated as a young generation space. The configuration system may apply the new VM configuration without terminating the VM executing the application. Alternatively, the configuration system may terminate the VM executing the application, and restart the VM using the new VM configuration.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
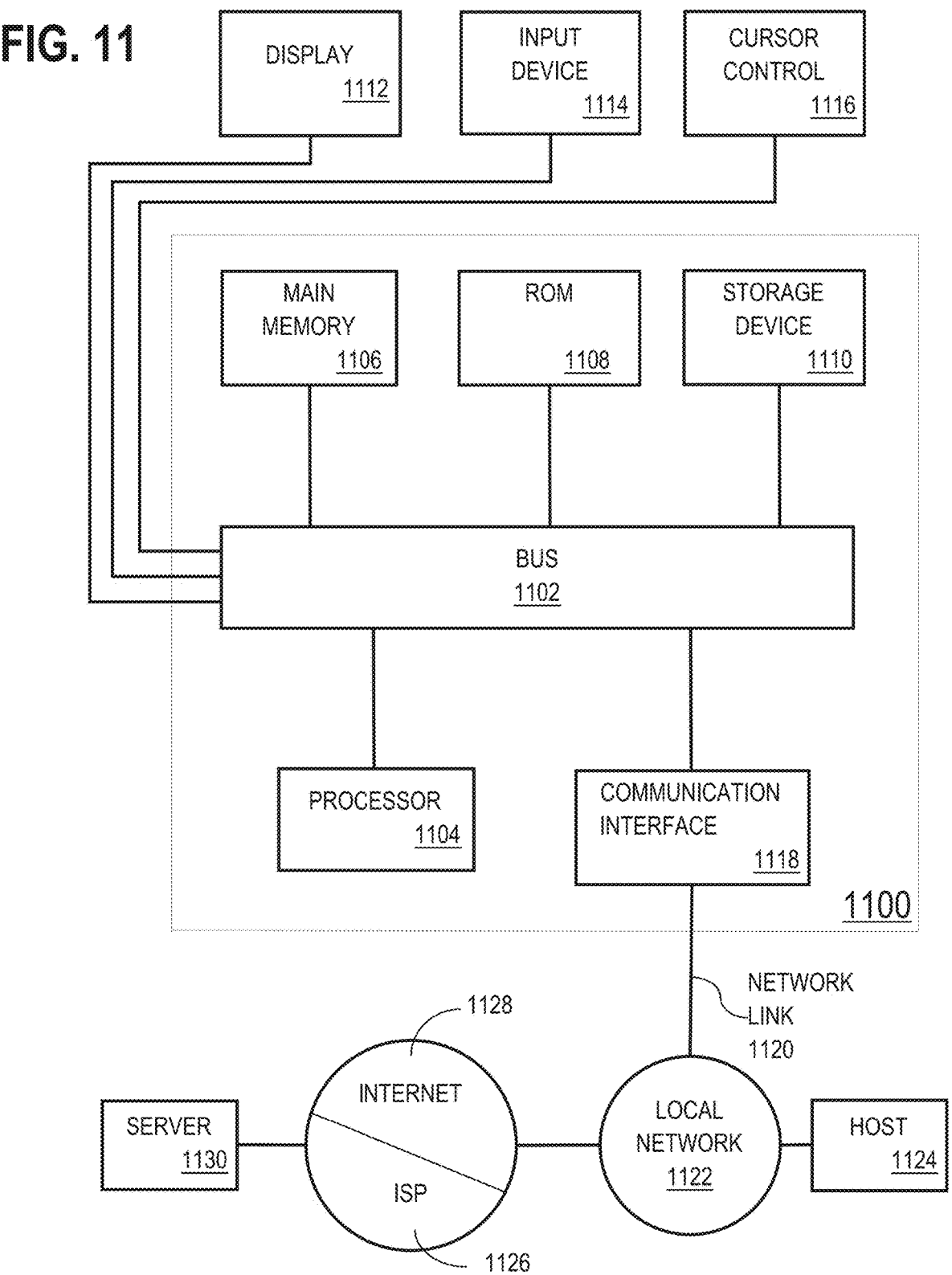
FIG. 11 shows a block diagram that illustrates a computer system, in accordance with one or more embodiments.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1110. Volatile media includes dynamic memory, such as main memory 1106. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

What is claimed is:

1. A non-transitory computer readable medium comprising instructions which, when executed by one or more hardware processors, cause performance of operations comprising:
    obtaining a set of garbage collection (GC) characteristics associated with a first set of one or more GC cycles executed on a first memory, wherein the first memory is allocated for execution of a program;
    determining a target cumulative pause time, per time interval, for a second set of one or more GC cycles executed on a second memory that is allocated for execution of the program;
    determining a virtual machine configuration for executing the program based on (a) the target cumulative pause time, per the time interval, and (b) one or more of the set of GC characteristics;
    causing application of the virtual machine configuration to a virtual machine, wherein the virtual machine executes the program.

2. The medium of claim 1, wherein:
    the first memory comprises (a) a first region configured to store objects that have not satisfied a criteria for being promoted from the first region to a second region, and (b) the second region comprising objects that have satisfied the criteria for being promoted from the first region to the second region; and
    the virtual machine configuration comprises a memory size of the first region of the first memory.

3. The medium of claim 1, wherein:
    the first memory comprises (a) a first region configured to store objects that have not satisfied a criteria for being promoted from the first region to a second region, and (b) the second region comprising objects that have satisfied the criteria for being promoted from the first region to the second region;
    the set of GC characteristics comprises one or more of:
        (a) a first memory size of at least a portion of the first region that is allocated before a GC cycle of the set of GC cycles;
        (b) a second memory size of at least a portion of the first region that is allocated after the GC cycle;
        (c) a third memory size of at least a portion of the second region that is allocated before the GC cycle;
        (d) a fourth memory size of at least a portion of the second region that is allocated after the GC cycle;
        (e) a number of objects promoted from the first region to the second region in the GC cycle.

4. The medium of claim 1, wherein the memory is allocated for execution of the program during execution of the program.

5. The medium of claim 1, wherein determining the virtual machine configuration for executing the program based on (a) the target cumulative pause time, per the time interval, and (b) the one or more of the set of GC characteristics in the GC log comprises:
    determining an average GC characteristic, for a time period, based on the one or more of the set of GC characteristics, wherein a first duration of the time interval and a second duration of the time period are same;
    determining the virtual machine configuration for executing the program based on the average GC characteristic for the time period.

6. The medium of claim 1, wherein determining the virtual machine configuration for executing the program based on (a) the target cumulative pause time, per the time interval, and (b) the one or more of the set of GC characteristics in the GC log comprises:
   determining a cumulative GC characteristic, for a time period, wherein a first duration of the time interval and a second duration of the time period are same;
   determining the virtual machine configuration for executing the program based on the cumulative GC characteristic for the time period.

7. The medium of claim 1, wherein the operations further comprise:
   determining respective cumulative pause times for each of a plurality of time intervals;
   identifying a particular time interval, of the plurality of time intervals, associated with a particular cumulative pause time that exceeds the target cumulative pause time;
   determining an input GC characteristic comprising one or more of: an average GC characteristic for the particular time interval and a cumulative GC characteristic for the particular time interval;
   determining the virtual machine configuration for executing the program based on the input GC characteristic.

8. The medium of claim 1, wherein the operations further comprise:
   determining a target count of GC cycles, per the time interval, to be executed on the second memory;
   determining the virtual machine configuration for executing the program further based on the target number of GC cycles per the time interval.

9. The medium of claim 1, wherein the set of GC characteristics are determined from a single execution of the program.

10. A non-transitory computer readable medium comprising instructions which, when executed by one or more hardware processors, cause performance of operations comprising:
   obtaining a set of garbage collection (GC) characteristics associated with a set of one or more GC cycles executed on a memory, wherein the memory is allocated for execution of a program;
   determining a relationship between GC variables based on the set of GC characteristics;
   determining a virtual machine configuration for executing the program based on the relationship between the GC variables;
   causing application of the virtual machine configuration to a virtual machine, wherein the virtual machine executes the program.

11. The medium of claim 10, wherein determining the relationship between the GC variables based on the set of GC characteristics comprises: fitting a polynomial function to the set of GC characteristics.

12. The medium of claim 10, wherein the relationship between the GC variables specifies a function that defines at least a first GC variable, of the GC variables, as a function of at least a second GC variable, of the GC variables.

13. The medium of claim 10, wherein determining the virtual machine configuration for executing the program based on the relationship between the GC variables comprises:
   obtaining a target cumulative GC characteristic per interval;
   determining cumulative GC characteristics, for each of a plurality of intervals, based on the set of GC characteristics, wherein durations of the plurality of intervals and a duration of the interval are same;
   identifying a particular interval, of the plurality of intervals, associated with a cumulative GC characteristic that does not satisfy the target cumulative GC characteristic;
   determining an input GC characteristic comprising one or more of: an average GC characteristic for the particular interval and another cumulative GC characteristic for the particular interval;
   inputting at least the input GC characteristic into the relationship between the GC variables to determine an expected GC characteristic;
   determining the virtual machine configuration based on the expected GC characteristic.

14. The medium of claim 10, wherein determining the virtual machine configuration for executing the program based on the relationship between the GC variables comprises:
   obtaining a target average GC characteristic per interval;
   determining average GC characteristics, for each of a plurality of intervals, based on the set of GC characteristics, wherein durations of the plurality of intervals and a duration of the interval are same;
   identifying a particular interval, of the plurality of intervals, associated with an average GC characteristic that does not satisfy the target average GC characteristic;
   determining an input GC characteristic comprising one or more of: a cumulative GC characteristic for the particular interval and another average GC characteristic for the particular interval;
   inputting at least the input GC characteristic into the relationship between the GC variables to determine an expected GC characteristic;
   determining the virtual machine configuration based on the expected GC characteristic.

15. The medium of claim 10, wherein determining the virtual machine configuration for executing the program based on the relationship between the GC variables comprises:
   obtaining a target cumulative GC characteristic per interval;
   determining an input GC characteristic comprising one or more of: an average GC characteristic for a most recent interval and a cumulative GC characteristic for the most recent interval;
   inputting at least the input GC characteristic into the relationship between the GC variables to determine an expected GC characteristic;
   determining the virtual machine configuration based on the expected GC characteristic.

16. The medium of claim 10, wherein determining the virtual machine configuration for executing the program based on the relationship between the GC variables comprises:
   obtaining a second set of GC characteristics associated with a second set of one or more GC cycles executed on a second memory, wherein the second memory is allocated for execution of the program;
   inputting at least the second set of GC characteristics into the relationship between the GC variables to determine an expected GC characteristic;
   determining the virtual machine configuration based on the expected GC characteristic.

17. The medium of claim 10, wherein causing application of the virtual machine configuration to the virtual machine is performed while the virtual machine continues to execute the program.

18. The medium of claim 10, wherein causing application of the virtual machine configuration to the virtual machine includes restarting the virtual machine.

19. The medium of claim 10, wherein the set of GC characteristics is obtained from a GC log.

20. The medium of claim 10, wherein the set of GC characteristics is obtained from a single execution of the program.

21. A system, comprising:
at least one device including a hardware processor;
the system being configured to perform operations comprising:
obtaining a set of garbage collection (GC) characteristics associated with a set of one or more GC cycles executed on a memory, wherein the memory is allocated for execution of a program;
determining a relationship between GC variables based on the set of GC characteristics;
determining a virtual machine configuration for executing the program based on the relationship between the GC variables;
causing application of the virtual machine configuration to a virtual machine, wherein the virtual machine executes the program.

22. A method, comprising:
obtaining a set of garbage collection (GC) characteristics associated with a set of one or more GC cycles executed on a memory, wherein the memory is allocated for execution of a program;
determining a relationship between GC variables based on the set of GC characteristics;
determining a virtual machine configuration for executing the program based on the relationship between the GC variables;
causing application of the virtual machine configuration to a virtual machine, wherein the virtual machine executes the program;
wherein the method is performed by at least one device including a hardware processor.

* * * * *